United States Patent
Aoyagi et al.

(10) Patent No.: US 9,398,610 B2
(45) Date of Patent: Jul. 19, 2016

(54) MOBILE COMMUNICATION METHOD, MOBILE STATION, AND NETWORK DEVICE

(75) Inventors: Kenichiro Aoyagi, Yokosuka (JP); Masafumi Masuda, Yokosuka (JP); Mikio Iwamura, Yokohama (JP)

(73) Assignee: NTT DOCOMO, INC., Tokyo (JP)

( * ) Notice: Subject to any disclaimer, the term of this patent is extended or adjusted under 35 U.S.C. 154(b) by 249 days.

(21) Appl. No.: 13/132,813

(22) PCT Filed: Dec. 3, 2009

(86) PCT No.: PCT/JP2009/070287
§ 371 (c)(1),
(2), (4) Date: Aug. 10, 2011

(87) PCT Pub. No.: WO2010/064668
PCT Pub. Date: Jun. 10, 2010

(65) Prior Publication Data
US 2011/0287800 A1 Nov. 24, 2011

(30) Foreign Application Priority Data
Dec. 3, 2008 (JP) ................................. 2008-308841

(51) Int. Cl.
*H04B 7/00* (2006.01)
*H04W 72/00* (2009.01)
(Continued)

(52) U.S. Cl.
CPC ............ *H04W 74/002* (2013.01); *H04W 48/12* (2013.01); *H04W 48/18* (2013.01); *H04W 48/20* (2013.01); *H04W 74/0833* (2013.01); *H04W 76/02* (2013.01)

(58) Field of Classification Search
CPC ... H04W 36/14; H04W 88/06; H04W 84/045; H04W 48/18; H04W 36/32; H04W 36/00; H04W 72/00; H04W 76/02; H04W 48/20; H04W 72/02; H04W 36/0022; H04W 76/027; H04W 36/04; H04W 48/16; H04W 36/24
USPC ........................ 455/435.1, 436–444, 515, 450
See application file for complete search history.

(56) References Cited

U.S. PATENT DOCUMENTS 6,771,964 B1 * 8/2004 Einola et al. .................. 455/437
8,019,331 B2 * 9/2011 Khetawat ............ H04W 60/005
370/395.2

(Continued)

OTHER PUBLICATIONS

3GPP TSG-RAN-WG2 Meeting #63, R2-083929, "Introduction of Fast Redirection to LTE", NTT DoCoMo, pp. 1-13, (Aug. 18-22, 2008).

(Continued)

*Primary Examiner* — Olumide T Ajibade Akonai
(74) *Attorney, Agent, or Firm* — Oblon, McClelland, Maier & Neustadt, L.L.P.

(57) ABSTRACT

A mobile communication method according to the present invention includes a step of a mobile station UE transmitting a connection setup request signal containing a radio access capability of the mobile station eNB to a radio network controller RNC of a UMTS scheme, upon detecting a predetermined trigger while camping on in a cell of the first communication scheme, a step of the radio network controller RNC of the UMTS scheme transmitting an instruction signal for instructing setup of a connection in a cell of an LTE scheme to the mobile station UE, in a case where the radio access capability of the mobile station UE is contained in the received connection setup request signal, and a step of the mobile station UE setting up the connection in the cell of the LTE scheme in response to the received instruction signal.

9 Claims, 5 Drawing Sheets

(51) Int. Cl.
*H04W 74/00* (2009.01)
*H04W 48/18* (2009.01)
*H04W 48/20* (2009.01)
*H04W 48/12* (2009.01)
*H04W 74/08* (2009.01)
*H04W 76/02* (2009.01)

(56) References Cited

U.S. PATENT DOCUMENTS

| | | | | |
|---|---|---|---|---|
| 8,938,244 | B2* | 1/2015 | Osborn | 455/444 |
| 2003/0224791 | A1* | 12/2003 | Choi et al. | 455/436 |
| 2004/0106430 | A1* | 6/2004 | Schwarz | H04W 28/18 455/552.1 |
| 2005/0048969 | A1* | 3/2005 | Shaheen et al. | 455/426.1 |
| 2005/0202823 | A1* | 9/2005 | Shaheen et al. | 455/436 |
| 2006/0221901 | A1* | 10/2006 | Yaqub et al. | 370/331 |
| 2007/0224988 | A1* | 9/2007 | Shaheen | 455/436 |
| 2008/0305825 | A1* | 12/2008 | Shaheen | 455/552.1 |
| 2008/0310358 | A1* | 12/2008 | Shaheen | 370/329 |
| 2009/0010237 | A1* | 1/2009 | Asou et al. | 370/338 |
| 2010/0099405 | A1* | 4/2010 | Brisebois et al. | 455/434 |
| 2010/0159934 | A1* | 6/2010 | Forssell | 455/437 |

OTHER PUBLICATIONS

3GPP TSG-RAN WG2 Meeting #56, R2-063067, "Service Based Redirection During Connection Setup in E-UTRAN", Nokia, pp. 1-2, (Nov. 6-10, 2006).

3GPP TSG-RAN WG2 Meeting #58bis, R2-072390, R2-071723, "Requirements for Redirection in E-UTRAN", Nokia, Nokia Siemens Networkds, Telecom Italia, T-Mobile, pp. 1-3, (Jun. 25-29, 2007).

3GPP TS 25.331 V10.3.1, "$3^{rd}$ Generation Partnership Project; Technical Specification Group Radio Access Network; Radio Resource Control (RRC); Protocol Specification (Release 10)", pp. 1-1864 (Apr. 2011).

International Search Report Issued Mar. 2, 2010 in PCT/JP09/070287 filed Dec. 3, 2009.

Office Action issued Dec. 11, 2012 in Japanese Patent Application No. 2008-308841 (with English-language translation).

Office Action issued in Chinese Patent Application No. 200980148826.X on Jul. 3, 2013.

Official Action issued on Mar. 21, 2014, in the counterpart Chinese Patent Application No. 200980148826.X, with an English translation of the Office Action.

Extended Search Report mailed May 23, 2016, in European Patent Application No. 09830434.8.

Huawei, "Redirection scheme in LTE," 3GPP TSG RAN WG2 #59, Aug. 15, 2007, 3 pages.

* cited by examiner

FIG. 3

| COMMUNICATION SERVICE | PS SERVICE |
|---|---|
| COMMUNICATION PROCESSING | OUTGOING PROCESSING INCOMING PROCESSING |
| ⋮ | ⋮ |

FIG. 4

| UMTS | LTE |
|---|---|
| CELL #1 | CELL #101 |
| CELL #2 | CELL #201 |
| ⋮ | ⋮ |

| CELL | RADIO QUALITY |
|---|---|
| CELL #101 | $Q_1$ |
| CELL #201 | $Q_2$ |
| ⋮ | ⋮ |

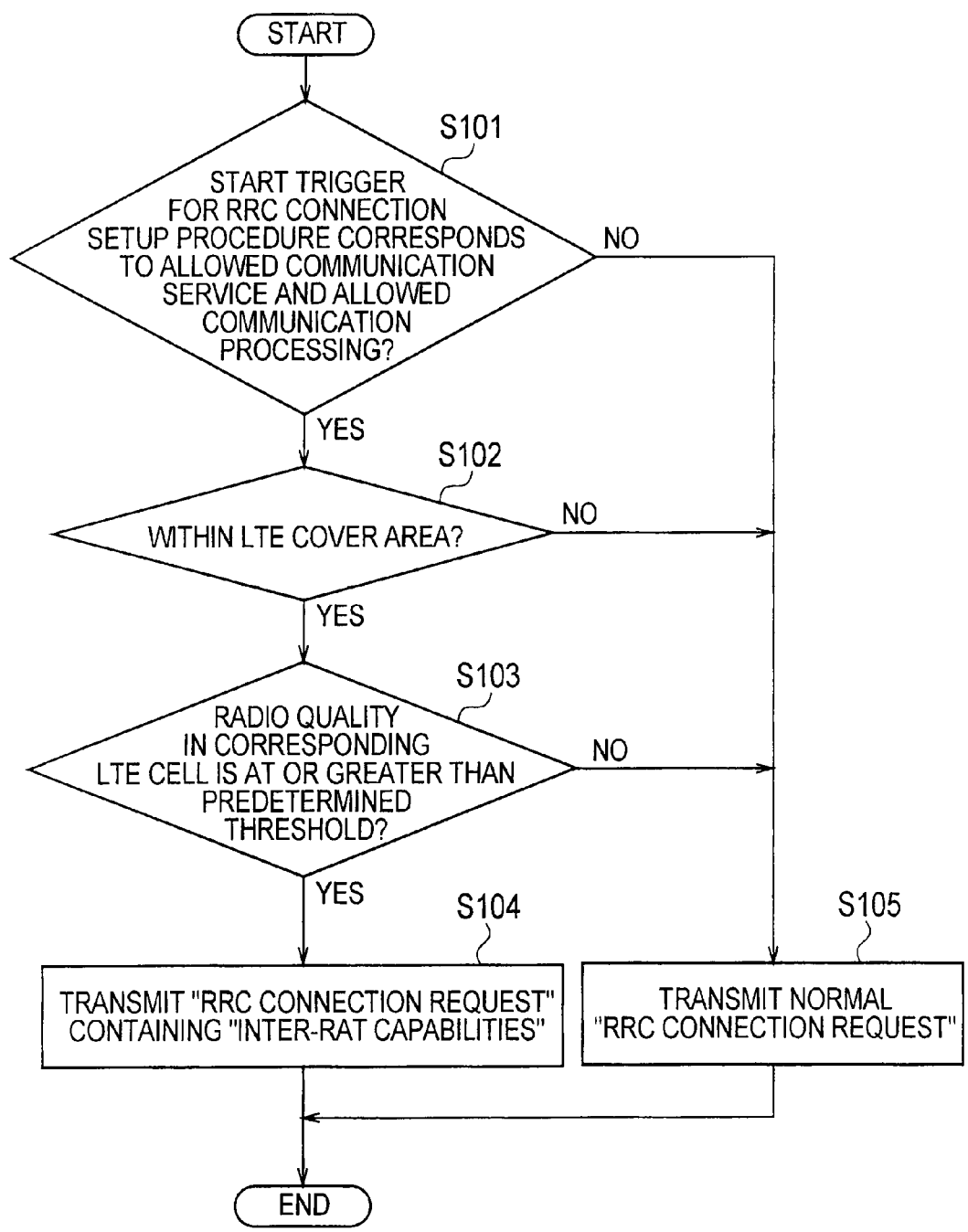

MOBILE COMMUNICATION METHOD, MOBILE STATION, AND NETWORK DEVICE

TECHNICAL FIELD

The present invention relates to a mobile communication method, a mobile station, and a network device.

BACKGROUND ART

WCDMA mobile communication systems use an established "RRC Connection Setup Procedure" in which, in an attempt to set up a connection in a specific cell, a mobile station UE transmits an "RRC Connection Request (connection setup request signal)" to a network device (e.g., radio network controller RNC or the like) in a radio access network. The network device in turn secures a radio resource for the connection and issues a notification to the mobile station UE, so that the connection is set up.

SUMMARY OF THE INVENTION

Problems to be Solved by the Invention

In conventional WCDMA mobile communication systems, the mobile station UE is configured to set up a connection in a cell of a preselected first communication scheme in a case where the mobile station UE possesses capabilities to handle multiple communication schemes (Radio Access Technologies: RATs) such as the LTE (Long Term Evolution) scheme, the UMTS (Universal Mobile Telecommunications System) scheme, and the GSM (Global System for Mobile Communications) scheme.

Then, if the mobile station UE determines by an instruction from its user or the network device that the mobile station UE should transition to a cell of a second communication scheme, the mobile station UE performs an Inter-RAT handover procedure to set up a connection in a cell of the second communication scheme.

In the above case, a radio resource for the connection is first secured in the cell of the first communication scheme, and the setup of the connection in the cell of the second communication scheme is attempted thereafter. This causes problems that the radio resource in the cell of the first communication scheme is wasted and the time required to set up the connection in the cell of the second communication scheme is made longer.

The present invention has been made in view of the above-mentioned problems, and an objective thereof is to provide a mobile communication method, a mobile station, and a network device that are capable of shortening the connection setup time while avoiding the wasting of a radio resource.

Means for Solving the Problems

The first feature of the present invention is summarized in that a mobile communication method including: a step A of a mobile station transmitting a connection setup request signal containing a radio access capability of the mobile station to a network device of a first communication scheme, upon detecting a predetermined trigger while camping on in a cell of the first communication scheme; a step B of the network device of the first communication scheme transmitting an instruction signal for instructing redirection to a second communication scheme for the mobile station, in a case where the radio access capability of the mobile station is contained in the received connection setup request signal; and a step C of the mobile station setting up the connection in the cell of the second communication scheme in response to the received instruction signal.

The second feature of the present invention is summarized in that a mobile station capable of communication in a cell of a first communication scheme and a cell of a second communication scheme, wherein the mobile station is configured to transmit a connection setup request signal containing a radio access capability of the mobile station to a network device of the first communication scheme, upon detecting a predetermined trigger while camping on in a cell of the first communication scheme, the mobile station is configured to set up a connection in a cell of the second communication scheme in response to an instruction signal transmitted from the network device of the first communication scheme, and the instruction signal is a signal which the network device of the first communication scheme transmits to the mobile station in a case where the radio access capability of the mobile station is contained in the received connection setup request signal, and is a signal for instructing redirection to the second communication scheme.

The third feature of the present invention is summarized in that a network device of a first communication scheme, wherein the network device is configured to transmit an instruction signal for instructing redirection to a second communication scheme for a mobile station camping on in a cell of the first communication scheme, in a case where a radio access capability of the mobile station is contained in a connection setup request signal received from the mobile station.

Effects of the Invention

As described above, according to the present invention, it is possible to provide a mobile communication method, a mobile station, and a network device that are capable of shortening the connection setup time while avoiding the wasting of a radio resource.

BRIEF DESCRIPTION OF THE DRAWINGS

FIG. 3 is a diagram showing an example of determination information managed by the mobile station according to the first embodiment of the present invention.

FIG. 4 is a diagram showing another example of the determination information managed by the mobile station according to the first embodiment of the present invention.

FIG. 8 is a flowchart showing an operation of the mobile station according to the first embodiment of the present invention.

MODES FOR CARRYING OUT THE INVENTION

Configuration of Mobile Communication System According to First Embodiment of Present Invention The configuration of a mobile communication system according to a first embodiment of the present invention will be described by referring to FIGS. 1 to 6.

Figure 1:
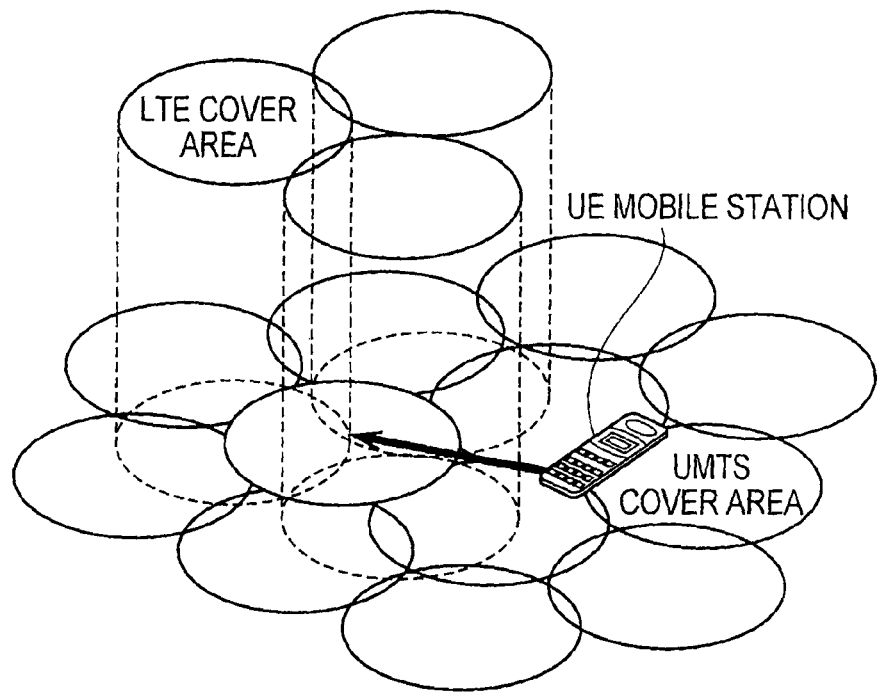
FIG. 1 is an overall configurational view of a mobile communication system according to a first embodiment of the present invention.

As shown in FIG. 1, the mobile communication system according to this embodiment includes a cover area formed of cells of the UMTS scheme (first communication scheme) and a cover area formed of cells of the LTE scheme (second communication scheme).

In the mobile communication system according to this embodiment, a mobile station UE is configured to camp on preferentially in a UMTS cell in view of the size of the cover area and the available communication services.

Figure 2:
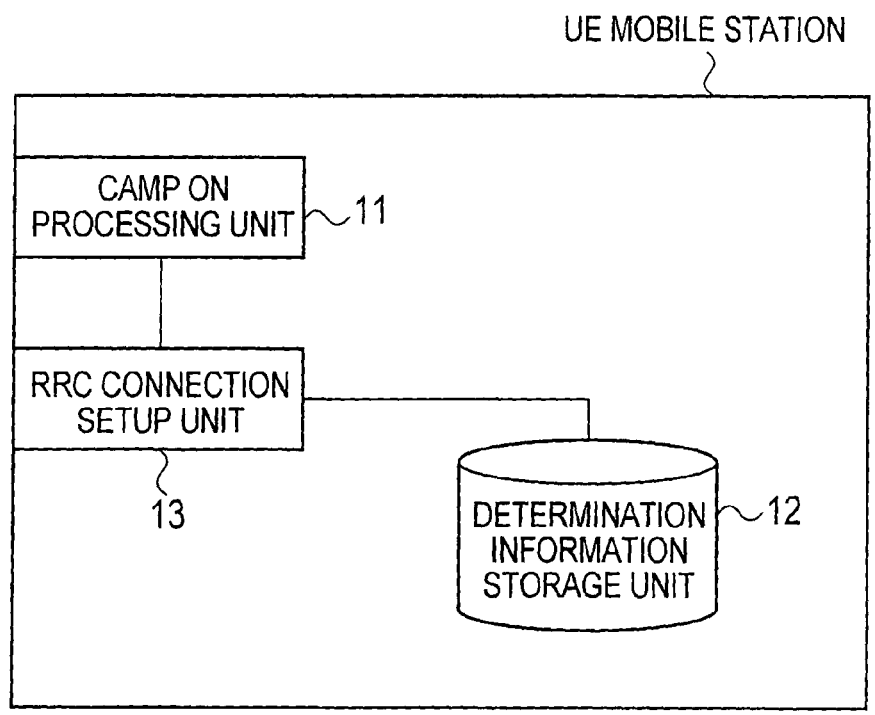
FIG. 2 is a functional block diagram of a mobile station according to the first embodiment of the present invention.

As shown in FIG. 2, the mobile station UE includes a camp on processing unit 11, a determination information storage unit 12, and an RRC connection setup unit 13.

The camp on processing unit 11 is configured to select a cell satisfying a predetermined condition and camp on in the selected cell. Here, the predetermined condition may be configured to be notified by a network device (e.g., exchange) at the time of a location registration processing.

The determination information storage unit 12 is configured to store determination information. Here, the determination information is information used when the RRC connection setup unit 13 determines whether or not to transmit an "RRC Connection Request (connection setup request signal)" containing "Inter-RAT capabilities (radio access capabilities of the mobile station UE)."

For example, as shown in FIG. 3, the determination information storage unit 12 may be configured to store communication services and communication processings which are allowed in LTE cells, as the determination information.

Here, conceivable communication services include a PS service (packet switching service), a CS service (circuit switching service), and the like. Conceivable communication processings include an incoming processing, an outgoing processing, and the like.

Incidentally, in the example in FIG. 3, a PS service is stored as the communication service allowed in LTE cells, and an outgoing processing and an incoming processing are stored as the communication processings allowed in LTE cells.

Moreover, as shown in FIG. 4, the determination information storage unit 12 may be configured to store the geographical correspondence between UMTS cells and LTE cells as the determination information.

Here, the determination information storage unit 12 may be configured to store only an LTE cell that geographically corresponds to the UMTS cell in which the camp on processing unit 11 is camping on, as the determination information.

Incidentally, in the example in FIG. 4, a UMTS cell #1 geographically corresponds to (i.e., geographically overlaps with) an LTE cell #101, and a UMTS cell #2 geographically corresponds to (i.e., geographically overlaps with) an LTE cell #201.

Figures 5, 6:
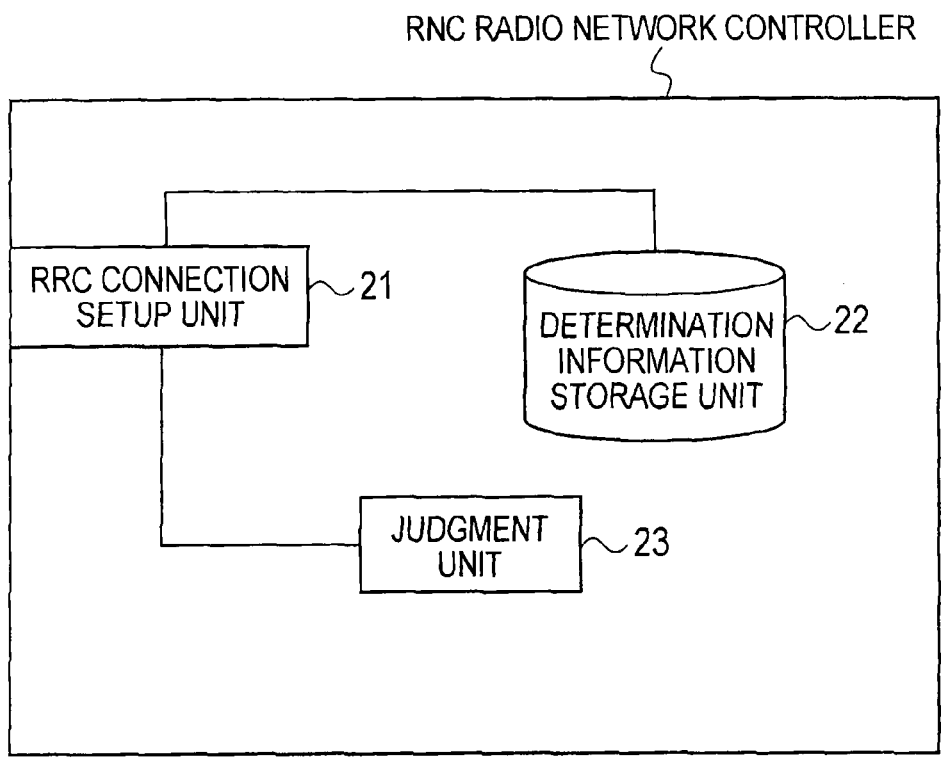
FIG. 5 is a diagram showing yet another example of the determination information managed by the mobile station according to the first embodiment of the present invention.
FIG. 6 is a functional block diagram of a radio network controller according to the first embodiment of the present invention.

Further, as shown in FIG. 5, the determination information storage unit 12 may be configured to store a radio quality in LTE cells as the determination information. Conceivable radio qualities include the reception power of a pilot signal, SIR (Signal to Interference Ratio), and the like.

Here, the determination information storage unit 12 may be configured to store only the radio quality in an LTE cell that geographically corresponds to the UMTS cell in which the camp on processing unit 11 is camping on, as the determination information.

Meanwhile, the above-mentioned determination information may be configured to be notified within the UMTS cell by using a predetermined signal such as a broadcast signal. With such a configuration, the determination information can be made variable.

The RRC connection setup unit 13 is configured to set up an RRC connection with a radio network controller RNC being a network device of the UMTS scheme, or a radio station eNB being a network device of the LTE scheme.

Specifically, in a case where the camp on processing unit 11 is camping on in a UMTS cell, the RRC connection setup unit 13 is configured to transmit an "RRC Connection Request" to a radio network controller RNC to switch the RRC connection setup destination from the UMTS cell to an LTE cell.

Here, the RRC connection setup unit 13 is configured to transmit an "RRC Connection Request" containing "Inter-RAT capabilities" to the radio network controller RNC, upon detecting a predetermined trigger while the camp on processing unit 11 is camping on in the UMTS cell.

Here, conceivable predetermined triggers include start triggers for an outgoing processing and an incoming processing for a PS service and a CS service, and the like.

In such a case, the RRC connection setup unit 13 may be configured to, for example, refer to the determination information stored in the determination information storage unit 12, and judge whether or not to transmit the "RRC Connection Request" containing the "Inter-RAT capabilities," in accordance with at least one of the communication service and the communication processing allowed in LTE cells.

Specifically, the RRC connection setup unit 13 is configured to transmit the "RRC Connection Request" containing the "Inter-RAT capabilities," upon detecting a start trigger for the communication service and the communication processing allowed in LTE cells as the predetermined trigger while the camp on processing unit 11 is camping on in the UMTS cell.

For example, the RRC connection setup unit 13 may be configured to transmit the "RRC Connection Request" containing the "Inter-RAT capabilities" upon detecting a start trigger for the outgoing processing for the PS service as the predetermined trigger while the camp on processing unit 11 is camping on in the UMTS cell, whereas transmitting an "RRC Connection Request" containing no "Inter-RAT capabilities" upon detecting a start trigger for the outgoing processing for the CS service as the predetermined trigger while the camp on processing unit 11 is camping on in the UMTS cell.

Moreover, the RRC connection setup unit 13 may be configured to refer to the determination information stored in the determination information storage unit 12, upon detecting the predetermined trigger while the camp on processing unit 11 is camping on in the UMTS cell. Then, if determining that there exists an LTE cell geographically corresponding to the UMTS cell in which the camp on processing unit 11 is camping on, the RRC connection setup unit 13 may be configured to transmit the "RRC Connection Request" containing the "Inter-RAT capabilities."

On the other hand, the RRC connection setup unit 13 may be configured to refer to the determination information stored in the determination information storage unit 12, upon detecting the predetermined trigger while the camp on processing unit 11 is camping on in the UMTS cell. Then, if determining that there exists no LTE cell geographically corresponding to the UMTS cell in which the camp on processing unit 11 is camping on, the RRC connection setup unit 13 may be configured to transmit the "RRC Connection Request" containing no "Inter-RAT capabilities."

Furthermore, the RRC connection setup unit 13 may be configured to refer to the determination information stored in the determination information storage unit 12, upon detecting the predetermined trigger while the camp on processing unit 11 is camping on in the UMTS cell. Then, if determining that the radio quality in the LTE cell geographically corresponding to the UMTS cell in which the camp on processing unit 11 is camping on satisfies the aforementioned predetermined condition, the RRC connection setup unit 13 may be configured to transmit the "RRC Connection Request" containing the "Inter-RAT capabilities."

On the other hand, the RRC connection setup unit 13 may be configured to refer to the determination information stored in the determination information storage unit 12, upon detecting the predetermined trigger while the camp on processing unit 11 is camping on in the UMTS cell. Then, if determining that the radio quality in the LTE cell geographically corresponding to the UMTS cell in which the camp on processing unit 11 is camping on does not satisfy the predetermined condition, the RRC connection setup unit 13 may be configured to transmit the "RRC Connection Request" containing no "Inter-RAT capabilities."

As shown in FIG. 6, the radio network controller RNC includes an RRC connection setup unit 21, a determination information storage unit 22, and a judgment unit 23.

The RRC connection setup unit 21 is configured to set up an RRC connection with the mobile station UE in response to the "RRC Connection Request" transmitted from the mobile station UE.

The determination information storage unit 22 is configured to have determination information as in the case of the above-mentioned determination information storage unit 12. Note that the determination information storage unit 22 may be configured to store the determination information for each individual mobile station UE.

The judgment unit 23 is configured to judge whether or not the "Inter-RAT capabilities" are contained in the "RRC Connection Request" received from the mobile station UE camping on in the UMTS cell.

Then, if judging that the "Inter-RAT capabilities" are contained in the received "RRC Connection Request," the judgment unit 23 instructs the RRC connection setup unit 21 to transmit an "RRC Connection Reject."

Here, in a case where the "RRC Connection Request" transmitted from the mobile station UE is received but the above-mentioned instruction is issued from the judgment unit 23, i.e., the received "RRC Connection Request" is judged to contain the "Inter-RAT capabilities," the RRC connection setup unit 21 transmits the "RRC Connection Reject" to the mobile station UE so as to instruct it to set up an RRC connection in an LTE cell, i.e., to perform "Redirection."

Moreover, upon receiving the "RRC Connection Request" transmitted from the mobile station UE, the RRC connection setup unit 21 may be configured to refer to the determination information stored in the determination information storage unit 22 and judge whether or not to transmit the above-mentioned "RRC Connection Reject," in accordance with at least one of the communication service and the communication processing that are allowed in LTE cells.

Specifically, the RRC connection setup unit 21 may be configured to set up an RRC connection with the mobile station UE instead of transmitting the "RRC Connection Reject" to the mobile station UE, in a case where the "RRC Connection Request" is judged to contain the "Inter-RAT capabilities" but the received "RRC Connection Request" is related to an RRC connection related to a communication service and a communication processing that are not allowed in LTE cells.

Moreover, the RRC connection setup unit 21 may be configured not to transmit the above-mentioned "RRC Connection Reject" in a case where the "RRC Connection Request" is judged to contain the "Inter-RAT capabilities" but there exists no LTE cell geographically corresponding to the UMTS cell in which the mobile station UE is camping on.

Furthermore, in a case where the radio quality in the LTE cell geographically corresponding to the UMTS cell in which the mobile station UE is camping on does not satisfy the predetermined condition, the RRC connection setup unit 21 may be configured not to transmit the above-mentioned "RRC Connection Reject."

Note that only the mobile station UE may include the determination information storage unit 12, or both the mobile station UE and the radio network controller RNC may include the determination information storage units 12 and 22.

Operation of Mobile Communication System
According to First Embodiment of Present Invention An operation of the mobile communication system according to the first embodiment of the present invention will be described by referring to FIGS. 7 and 8.

Figure 7:
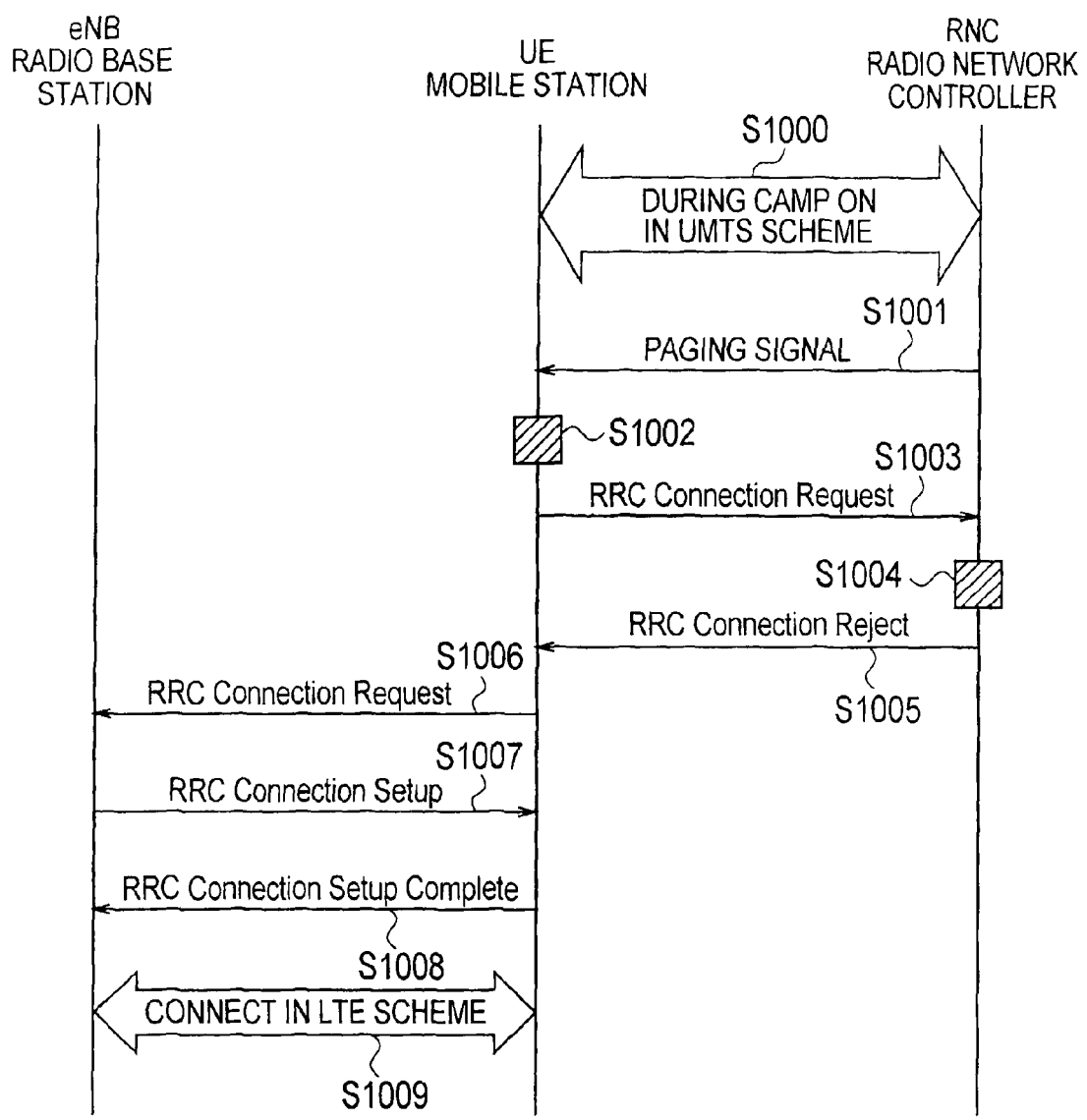
FIG. 7 is a sequence diagram showing an operation of the mobile communication system according to the first embodiment of the present invention.

As shown in FIG. 7, if a mobile station UE camping on in a UMTS cell in step S1000 receives a PS-service paging signal addressed to the mobile station UE from a radio network controller RNC in step S1001, the mobile station UE makes a judgment in step S1002 as to which one of an "RRC Connection Request" containing "Inter-RAT capabilities" and an "RRC Connection Request" containing no "Inter-RAT capabilities" should be transmitted to the radio network controller RNC.

In the following, this judging method will be described by referring to FIG. 8.

As shown in FIG. 8, in step S101, the mobile station UE judges whether or not a start trigger for a setup procedure for an RRC connection (in the example in FIG. 7, the receiving of the PS-service paging signal addressed to the mobile station UE) corresponds to the communication service and the communication processing which are allowed in LTE cells.

Here, the operation proceeds to step S102 if the judgment is "YES" whereas the operation proceeds to step S105 if the judgment is "NO."

In step S102, the mobile station UE judges whether the UMTS cell in which the mobile station UE is camping on is a cell within an LTE cover area (i.e., whether or not there exists an LTE cell geographically corresponding to the UMTS cell).

Here, the operation proceeds to step S103 if the judgment is "YES" whereas the operation proceeds to step S105 if the judgment is "NO."

In step S103, the mobile station UE judges whether or not the radio quality in the LTE cell geographically corresponding to the UMTS cell in which the mobile station UE is camping on satisfies the predetermined condition.

Here, the operation proceeds to step S104 if the judgment is "YES" whereas the operation proceeds to step S105 if the judgment is "NO."

In step S104, the mobile station UE judges that an "RRC Connection Request" containing "Inter-RAT capabilities" should be transmitted to the radio network controller RNC.

On the other hand, in step S105, the mobile station UE judges that an "RRC Connection Request" containing no "Inter-RAT capabilities" (i.e., a normal "RRC Connection Request") should be transmitted to the radio network controller RNC.

In the example in FIG. 7, in step S1003, the mobile station UE transmits an "RRC Connection Request" containing "Inter-RAT capabilities" to the radio network controller RNC.

In step S1004, based on whether or not the received "RRC Connection Request" contains the "Inter-RAT capabilities" and also on the above-mentioned determination information, the radio network controller RNC judges whether to set up an RRC connection or to transmit the above-mentioned "RRC Connection Reject."

In the example in FIG. 7, in step S1005, the radio network controller RNC transmits the "RRC Connection Reject" to the mobile station UE.

In step S1006, the mobile station UE transmits an "RRC Connection Request" to a radio base station eNB. In step S1007, the radio base station eNB transmits an "RRC Connection Setup" to the mobile station UE. In step S1008, the mobile station UE transmits an "RRC Connection Setup Complete" to the radio base station eNB.

As a result, in step S1009, the mobile station UE completes the setup of a connection in an LTE cell and transitions to a connected state.

Advantageous Effects of Mobile Communication System According to First Embodiment of Present Invention According to the mobile communication system according to the first embodiment of the present invention, the configuration is such that when a radio network controller RNC receives an "RRC Connection Request" containing "Inter-RAT capabilities" from a mobile station UE camping on in a UMTS cell, an RRC connection is set up between the mobile station UE and a radio base station eNB instead of setting up an RRC connection between the mobile station UE and the radio base controller RNC. Accordingly, it is possible to shorten the connection setup time while avoiding the wasting of a radio resource.

In addition, according to the mobile communication system according to the first embodiment of the present invention, based on the "Inter-RAT capabilities" contained in the "RRC Connection Request" received from the mobile station UE camping on in the UMTS cell, the radio network controller RNC can recognize the radio access capabilities of the mobile station UE. Accordingly, it is possible to avoid such a situation that the mobile station UE not compatible with the LTE scheme is instructed to perform "Redirection" to the LTE scheme.

Moreover, according to the mobile communication system according to the first embodiment of the present invention, in a case where the "Inter-RAT capabilities" are contained in the "RRC Connection Request (for a PS service)" received by the radio network controller RNC from the mobile station UE camping on in the UMTS cell, an RRC connection for the PS service is set up between a radio base station eNB and the mobile station UE. Accordingly, it is possible to provide a faster PS service to the mobile station UE.

Further, according to the mobile communication system according to the first embodiment of the present invention, in a case where the radio network controller RNC receives an "RRC Connection Request" related to a communication service and a communication processing which are not allowed in the LTE scheme from the mobile station UE camping on in the UMTS cell, it is possible to avoid such a situation that the mobile station UE is instructed to perform "Redirection" to the LTE scheme.

Furthermore, according to the mobile communication system according to the first embodiment of the present invention, in a case where there exists no LTE cell geographically corresponding to a UMTS cell, it is possible to avoid such a situation that the mobile station UE camping on in that UMTS cell is instructed to perform "Redirection" to the LTE scheme.

Also, according to the mobile communication system according to the first embodiment of the present invention, in a case where the radio quality in an LTE cell geographically corresponding to a UMTS cell is poor, it is possible to avoid such a situation that the mobile station UE camping on in that UMTS cell is instructed to perform "Redirection" to the LTE scheme.

The above-mentioned features of this embodiment may be expressed as below.

A first feature of this embodiment is a mobile communication method summarized as including: a step A (steps S1002 and S1003) of a mobile station UE transmitting an "RRC Connection Request (connection setup request signal)" containing "Inter-RAT capabilities (radio access capabilities of the mobile station UE)" to a radio network controller RNC (network device of the UMTS scheme (first communication scheme)), upon detecting a predetermined trigger while camping on in a cell of the UMTS scheme; a step B (steps S1004 and S1005) of the radio network controller RNC transmitting an "RRC Connection Reject (instruction signal)" for instructing setup of a connection in a cell of the LTE scheme (second communication scheme) to the mobile station UE, in a case where the "Inter-RAT capabilities" are contained in the received "RRC Connection Request;" and a step C (steps S1006 to S1009) of the mobile station UE setting up the connection in the LTE cell in response to the received "RRC Connection Reject."

In the first feature of this embodiment, in the step A (step S1002), the mobile station UE may judge whether or not to transmit the "RRC Connection Request" containing the "Inter-RAT capabilities," in accordance with at least one of a communication service and a communication processing that are allowed in the LTE cell.

In the first feature of this embodiment, in the step A (step S1002), the mobile station UE may transmit the "RRC Connection Request" containing the "Inter-RAT capabilities," in a case where there exists an LTE cell geographically corresponding to the UMTS cell in which the mobile station UE is camping on.

In the first feature of this embodiment, in the step A (step S1002), the mobile station UE may transmit the "RRC Connection Request" containing the "Inter-RAT capabilities" in a case where the radio quality in the LTE cell geographically corresponding to the UMTS cell in which the mobile station UE is camping on satisfies a predetermined condition.

In the first feature of this embodiment, in the step (step S1004), the radio network controller RNC may judge whether or not to transmit the above-mentioned "RRC Connection Reject," in accordance with at least one of a communication service and a communication processing that are allowed in the LTE cell.

In the first feature of this embodiment, in the step B (step S1004), the radio network controller RNC may transmit the above-mentioned "RRC Connection Reject" in a case where there exists an LTE cell geographically corresponding to the UMTS cell in which the mobile station UE is camping on.

In the first feature of this embodiment, in the step B (step S1004), the radio network controller RNC may transmit the above-mentioned "RRC Connection Reject" in a case where the radio quality in the LTE cell geographically corresponding to the UMTS cell in which the mobile station UE is camping on satisfies the predetermined condition.

In the first feature of this embodiment, the mobile communication method may further include a step of notifying the mobile station UE of the communication service and the communication processing that are allowed in the LTE cell, the notification being issued in the UMTS cell.

In the first feature of this embodiment, the mobile communication method may further include a step of notifying the mobile station UE of the geographical correspondence between the UMTS cell and an LTE cell, the notification being issued in the UMTS cell.

In the first feature of this embodiment, the mobile communication method may further include a step of notifying the mobile station UE of the radio quality in the LTE cell, the notification being issued in the UMTS cell.

A second feature of this embodiment is an mobile station UE summarized as being capable of communication in a cell of the UMTS scheme and a cell of the LTE scheme, and including an RRC connection setup unit 13 configured to transmit an "RRC Connection Request" containing "Inter-RAT capabilities" to a radio network controller RNC, upon detecting a predetermined trigger while camping on in a UMTS cell and also configured to set up a connection in an LTE cell in response to an "RRC Connection Reject" transmitted from the radio network controller RNC. In addition, the "RRC Connection Reject" is a signal which the radio network controller RNC transmits to the mobile station UE in a case where the "Inter-RAT capabilities" are contained in the received "RRC Connection Request," and is a signal for instructing setup of the connection in the LTE cell.

In the second feature of this embodiment, the RRC connection setup unit 13 may be configured to judge whether or not to transmit the "RRC Connection Request" containing the "Inter-RAT capabilities," in accordance with at least one of a communication service and a communication processing that are allowed in the LTE cell.

In the second feature of this embodiment, the RRC connection setup unit 13 may be configured to transmit the "RRC Connection Request" containing the "Inter-RAT capabilities" in a case where there exists an LTE cell geographically corresponding to the UMTS cell in which the mobile station UE is camping on.

In the second feature of this embodiment, the RRC connection setup unit 13 may be configured to transmit the "RRC Connection Request" containing the "Inter-RAT capabilities" in a case where the radio quality in the LTE cell geographically corresponding to the UMTS cell in which the mobile station UE is camping on satisfies a predetermined condition.

A third feature of this embodiment is a radio network controller RNC summarized as including an RRC connection setup unit 21 configured to transmit an "RRC Connection Reject" for instructing setup of a connection in a cell of the LTE scheme to a mobile station UE camping on in a cell of the UMTS scheme, in a case where "Inter-RAT capabilities" are contained in an "RRC Connection Request" received from the mobile station UE.

In the third feature of this embodiment, the RRC connection setup unit 21 may be configured to judge whether or not to transmit the above-mentioned "RRC Connection Reject," in accordance with at least one of a communication service and a communication processing that are allowed in the LTE cell.

In the third feature of this embodiment, the RRC connection setup unit 21 may be configured not to transmit the above-mentioned "RRC Connection Reject" in a case where the "Inter-RAT capabilities" are contained in the received "RRC Connection Request" but there exists no LTE cell geographically corresponding to the UMTS cell in which the mobile station UE is camping on.

In the third feature of this embodiment, the RRC connection setup unit 21 may be configured not to transmit the above-mentioned "RRC Connection Reject" in a case where the "Inter-RAT capabilities" are contained in the received "RRC Connection Request" but a radio quality in the LTE cell geographically corresponding to the UMTS cell in which the mobile station UE is camping on does not satisfy a predetermined condition.

Note that operation of the above described mobile station UE, radio base station eNB and radio network controller RNC may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the mobile station UE, radio base station eNB and radio network controller RNC. Also, the storage medium and the processor may be provided in the mobile station UE, radio base station eNB and radio network controller RNC as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A mobile communication method comprising:
   a step A of a mobile station transmitting a connection setup request signal containing a radio access capability of the mobile station to a network device of a first communication scheme, upon detecting a predetermined trigger while camping on in a cell of the first communication scheme, wherein the mobile station has not been allocated radio resources for the first communication scheme while it is camping on in the cell of the first communication scheme;
   a step B of the network device of the first communication scheme transmitting an instruction signal for instructing redirection to a cell of a second communication scheme for the mobile station, in a case where the radio access capability of the mobile station is contained in the received connection setup request signal; and
   a step C of the mobile station setting up the connection in the cell of the second communication scheme in response to the received instruction signal without the mobile station establishing a connection in the first communication scheme,
   wherein in the step A, the mobile station judges whether or not to transmit the connection setup request signal containing the radio access capability of the mobile station prior to the network device allocating radio resources for the mobile station for use in the first communication scheme and the second communication scheme, in accordance with at least one of a communication service and a communication processing that are allowed in the cell of the second communication scheme.

2. The mobile communication method according to claim 1, further comprising a step of notifying the mobile station of the communication service and the communication processing that are allowed in the cell of the second communication scheme, the notification being issued in the cell of the first communication scheme.

3. A mobile communication method comprising:
a step A of a mobile station transmitting a connection setup request signal containing a radio access capability of the mobile station to a network device of a first communication scheme, upon detecting a predetermined trigger while camping on in a cell of the first communication scheme, wherein the mobile station has not been allocated radio resources for the first communication scheme while it is camping on in the cell of the first communication scheme;
a step B of the network device of the first communication scheme transmitting an instruction signal for instructing redirection to a cell of a second communication scheme for the mobile station, in a case where the radio access capability of the mobile station is contained in the received connection setup request signal; and
a step C of the mobile station setting up the connection in the cell of the second communication scheme in response to the received instruction signal without the mobile station establishing a connection in the first communication scheme,
wherein in the step A, the mobile station transmits the connection setup request signal containing the radio access capability of the mobile station prior to the network device allocating radio resources for the mobile station for use in the first communication scheme and the second communication scheme, and in a case where there exists a cell of the second communication scheme geographically corresponding to the cell of the first communication scheme in which the mobile station is camping on.

4. The mobile communication method according to claim 3, further comprising a step of notifying the mobile station of a geographical correspondence between the cell of the first communication scheme and a cell of the second communication scheme, the notification being issued in the cell of the first communication scheme.

5. A mobile communication method comprising:
a step A of a mobile station transmitting a connection setup request signal containing a radio access capability of the mobile station to a network device of a first communication scheme, upon detecting a predetermined trigger while camping on in a cell of the first communication scheme, wherein the mobile station has not been allocated radio resources for the first communication scheme while it is camping on in the cell of the first communication scheme;
a step B of the network device of the first communication scheme transmitting an instruction signal for instructing redirection to a cell of a second communication scheme for the mobile station, in a case where the radio access capability of the mobile station is contained in the received connection setup request signal; and
a step C of the mobile station setting up the connection in the cell of the second communication scheme in response to the received instruction signal without the mobile station establishing a connection in the first communication scheme,
wherein in the step A, the mobile station transmits the connection setup request signal containing the radio access capability of the mobile station prior to the network device allocating radio resources for the mobile station for use in the first communication scheme and the second communication scheme, and in a case where a radio quality in the cell of the second communication scheme geographically corresponding to the cell of the first communication scheme in which the mobile station is camping on satisfies a predetermined condition.

6. The mobile communication method according to claim 5, further comprising a step of notifying the mobile station of the radio quality in the cell of the second communication scheme, the notification being issued in the cell of the first communication scheme.

7. A mobile station capable of communication in a cell of a first communication scheme and a cell of a second communication scheme, wherein
the mobile station is configured to transmit a connection setup request signal containing a radio access capability of the mobile station to a network device of the first communication scheme, upon detecting a predetermined trigger while camping on in a cell of the first communication scheme, wherein the mobile station has not been allocated radio resources for the first communication scheme while it is camping on in the cell of the first communication scheme,
the mobile station is configured to set up a connection in the cell of the second communication scheme in response to an instruction signal transmitted from the network device of the first communication scheme without the mobile station establishing a connection in the first communication scheme,
the instruction signal is a signal which the network device of the first communication scheme transmits to the mobile station in a case where the radio access capability of the mobile station is contained in the received connection setup request signal, and is a signal for instructing redirection to the cell of the second communication scheme, and
the mobile station is configured to judge whether or not the connection setup request signal containing the radio access capability of the mobile station is transmitted in accordance with at least one of a communication service and a communication processing that are allowed in the cell of the second communication scheme, and the mobile station transmits the connection setup request signal prior to the network device allocating radio resources for the mobile station for use in the first communication scheme and the second communication scheme.

8. A mobile station capable of communication in a cell of a first communication scheme and a cell of a second communication scheme, wherein
the mobile station is configured to transmit a connection setup request signal containing a radio access capability of the mobile station to a network device of the first communication scheme, upon detecting a predetermined trigger while camping on in a cell of the first communication scheme, wherein the mobile station has not been allocated radio resources for the first communication scheme while it is camping on in the cell of the first communication scheme, the mobile station is configured to set up a connection in the cell of the second communication scheme in response to an instruction signal transmitted from the network device of the first communication scheme without the mobile station establishing a connection in the first communication scheme, the instruction signal is a signal which the network device of the first communication scheme transmits to the mobile station in a case where the radio access capability of the mobile station is contained in the received connection setup request signal, and is a signal for instructing redirection to the cell of the second communication scheme, and the mobile station transmits the connection setup request signal containing the radio access capability of the mobile station in a case where there exists the cell of the second communication scheme geographically corresponding to the cell of the first communication scheme in which the mobile station is camping on, and the mobile station transmits the connection setup request signal prior to the network device allocating radio resources for the mobile station for use in the first communication scheme and the second communication scheme.

9. A mobile station capable of communication in a cell of a first communication scheme and a cell of a second communication scheme, wherein the mobile station is configured to transmit a connection setup request signal containing a radio access capability of the mobile station to a network device of the first communication scheme, upon detecting a predetermined trigger while camping on in a cell of the first communication scheme, wherein the mobile station has not been allocated radio resources for the first communication scheme while it is camping on in the cell of the first communication scheme, the mobile station is configured to set up a connection in the cell of the second communication scheme in response to an instruction signal transmitted from the network device of the first communication scheme without the mobile station establishing a connection in the first communication scheme, the instruction signal is a signal which the network device of the first communication scheme transmits to the mobile station in a case where the radio access capability of the mobile station is contained in the received connection setup request signal, and is a signal for instructing redirection to the cell of the second communication scheme, and the mobile station is configured to transmit the connection setup request signal containing the radio access capability of the mobile station prior to the network device allocating radio resources for the mobile station for use in the first communication scheme and the second communication scheme, and in a case where a radio quality in the cell of the second communication scheme geographically corresponding to the cell of the first communication scheme in which the mobile station is camping on satisfies a predetermined condition.

* * * * *